(12) United States Patent
Huang et al.

(10) Patent No.: US 10,669,209 B2
(45) Date of Patent: Jun. 2, 2020

(54) CERAMIC DEVICE AND MANUFACTURING METHOD THEREOF

(71) Applicant: Industrial Technology Research Institute, Hsinchu (TW)

(72) Inventors: Meng-Chi Huang, Taoyuan (TW); Tune-Hune Kao, Hsinchu (TW); Guan-Ting Lin, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 88 days.

(21) Appl. No.: 15/842,902

(22) Filed: Dec. 15, 2017

(65) Prior Publication Data

US 2019/0177231 A1   Jun. 13, 2019

(30) Foreign Application Priority Data

Dec. 7, 2017 (TW) .............................. 106142946 A (51) Int. Cl.
 *B32B 3/00* (2006.01)
 *C04B 35/465* (2006.01)
 (Continued)

(52) U.S. Cl.
 CPC ............ *C04B 35/465* (2013.01); *C04B 35/04* (2013.01); *C04B 41/009* (2013.01); *C04B 41/4541* (2013.01); *C04B 41/52* (2013.01); *C04B 41/5353* (2013.01); *C04B 41/88* (2013.01); *C04B 41/90* (2013.01);
 (Continued)

(58) Field of Classification Search
 None
 See application file for complete search history.

(56) References Cited

U.S. PATENT DOCUMENTS

| 4,668,925 A | * | 5/1987 | Towatari | .................. H01P 7/04 |
| | | | | 205/162 |
| 5,234,562 A | * | 8/1993 | Uenishi | ..................... B65C 3/10 |
| | | | | 118/423 |

(Continued)

FOREIGN PATENT DOCUMENTS

| CN | 205194818 | 4/2016 |
| TW | 201016093 | 4/2010 |

(Continued)

OTHER PUBLICATIONS

A.Bharatish et al., "Characterization of hole circularity and heat affected zone in pulsed CO2 laser drilling of alumina ceramics", Optics & Laser Technology, vol. 53, May 18, 2013, pp. 22-32.

(Continued)

*Primary Examiner* — Seth Dumbris
(74) *Attorney, Agent, or Firm* — JCIPRNET (57) ABSTRACT

A ceramic device including a ceramic material, a patterned metal structure, and a surface activation material is provided. A surface of the ceramic material at least includes a first surface and a second surface that are not coplanar. The ceramic material has recesses on the surface thereof. The patterned metal structure is disposed on the first surface and the second surface. The surface activation material is disposed on a surface of the recesses and located at an interface between the ceramic material and the patterned metal structure.

18 Claims, 8 Drawing Sheets

(51) Int. Cl.
*C04B 35/04* (2006.01)
*C04B 41/53* (2006.01)
*C23C 18/16* (2006.01)
*C25D 5/02* (2006.01)
*C23C 18/42* (2006.01)
*C04B 41/52* (2006.01)
*C23C 18/32* (2006.01)
*C04B 41/45* (2006.01)
*C04B 41/88* (2006.01)
*C04B 41/00* (2006.01)
*C23C 18/38* (2006.01)
*C23C 18/18* (2006.01)
*C25D 5/48* (2006.01)
*C04B 41/90* (2006.01)
*C04B 111/00* (2006.01)

(52) U.S. Cl.
CPC ...... *C23C 18/1633* (2013.01); *C23C 18/1651* (2013.01); *C23C 18/1653* (2013.01); *C23C 18/1689* (2013.01); *C23C 18/1879* (2013.01); *C23C 18/1893* (2013.01); *C23C 18/32* (2013.01); *C23C 18/38* (2013.01); *C23C 18/42* (2013.01); *C25D 5/02* (2013.01); *C25D 5/48* (2013.01); *C04B 2111/00844* (2013.01); *C04B 2235/3206* (2013.01); *C04B 2235/3208* (2013.01); *C04B 2235/72* (2013.01); *Y10T 428/24917* (2015.01)

(56) References Cited

U.S. PATENT DOCUMENTS

| | | | |
|---|---|---|---|
| 5,955,179 A | 9/1999 | Kickelhain et al. | |
| 6,809,612 B2 * | 10/2004 | Bloom | H01P 1/2136 333/134 |
| 6,833,776 B2 | 12/2004 | Wada et al. | |
| 7,321,278 B2 | 1/2008 | Vangala | |
| 7,541,893 B2 | 6/2009 | Ye | |
| 2003/0151474 A1 | 8/2003 | Wada et al. | |
| 2006/0192634 A1 | 8/2006 | Vangala | |
| 2006/0261913 A1 | 11/2006 | Ye | |
| 2010/0021657 A1 | 1/2010 | Lochtman et al. | |
| 2015/0208499 A1 * | 7/2015 | Wu | H05K 1/0306 174/255 |

FOREIGN PATENT DOCUMENTS

| | | |
|---|---|---|
| TW | M414036 | 10/2011 |
| TW | I354532 | 12/2011 |
| TW | 201304636 | 1/2013 |
| TW | M462745 | 10/2013 |
| TW | I478641 | 3/2015 |
| TW | M539186 | 4/2017 |

OTHER PUBLICATIONS

E. Kacar et al., "Characterization of the drilling alumina ceramic using Nd:YAG pulsed laser", Journal of Materials Processing Technology, vol. 209, No. 4, Feb. 19, 2009, pp. 2008-2014.

S.B. Rane et al., "Firing and processing effects on microstructure of fritted silver thick film electrode materials for solar cells", Materials Chemistry and Physics, vol. 82, No. 1, Sep. 28, 2003, pp. 237-245.

Xiaochuan Chen et al., "Improving cutting quality by analysis of microstructure characteristics and solidification behaviour of recast layer formation on laser cut ceramic", Journal of the European Ceramic Society, vol. 32, No. 10, Apr. 4, 2012, pp. 2203-2211.

Chwan-Huei Tsai et al., "Laser cutting of thick ceramic substrates by controlled fracture technique", Journal of Materials Processing Technology, vol. 136, No. 1-3, May 10, 2003, pp. 166-173.

Christian Goth et al., "Aerosol Jet Printing on Rapid Prototyping Materials for Fine Pitch Electronic Applications", 2011 IEEE 61st Electronic Components and Technology Conference (ECTC), May 31-Jun. 3, 2011, pp. 1211-1216.

Office Action of Taiwan Counterpart Application, dated Jul. 26, 2018, pp. 1-15.

* cited by examiner

FIG. 5B

CERAMIC DEVICE AND MANUFACTURING METHOD THEREOF

CROSS-REFERENCE TO RELATED APPLICATION

This application claims the priority benefit of Taiwan application serial no. 106142946, filed on Dec. 7, 2017. The entirety of the above-mentioned patent application is hereby incorporated by reference herein and made a part of this specification.

TECHNICAL FIELD

The disclosure relates to a device and a manufacturing method thereof, and more particularly, to a ceramic device and a manufacturing method thereof.

BACKGROUND

Currently, in the process of a ceramic device having a metal circuit, the metal circuit has a greater position accuracy error.

For instance, in the current manufacturing method of a ceramic filter, silver paste is first applied on a ceramic material and the silver paste is coated on the ceramic material and on a through-hole surface in the ceramic material via a rapid rotation method, and then the silver is cured on the ceramic material and the through-hole surface via high-temperature sintering. Next, silver metal on the surface to be patterned is polished and removed using an ultra-precision machining process, and then silver paste screen printing and silver paste sintering are performed to complete the electrode and metal structure surface of the filter.

In the method above, a silver paste screen printing technique and a metal slurry sintering technique are used in the manufacture of the metal circuit of the ceramic filter. However, since circuit size and position error (about 5% to 14% of position accuracy error) occur to the metal circuit due to high-temperature sintering, antenna frequency offset is large, and a lot of subsequent antenna repair need to be performed manually.

SUMMARY

The disclosure provides a ceramic device and a manufacturing method thereof that allows a metal circuit to have good position accuracy.

The disclosure provides a ceramic device including a ceramic material, a patterned metal structure, and a surface activation material. A surface of the ceramic material at least includes a first surface and a second surface that are not coplanar. The ceramic material has recesses on the surface thereof. The patterned metal structure is disposed on the first surface and the second surface. The surface activation material is disposed on a surface of the recesses and located at an interface between the ceramic material and the patterned metal structure.

The disclosure provides a manufacturing method of a ceramic device including the following steps. A ceramic material is provided. Recesses are formed on a surface of the ceramic material. After the recesses are formed, a surface activation treatment is performed on the surface of the ceramic material. A first metal layer is formed on the surface of the ceramic material after the surface activation treatment via an electroless plating process. A patterning process is performed on the first metal layer to form a first patterned metal layer.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

FIG. 1A to FIG. 1D are schematics of the manufacturing process of a ceramic device of an embodiment of the disclosure. FIG. 2 is a cross section along section line I-I' in FIG. 1D.

Figure 1A:
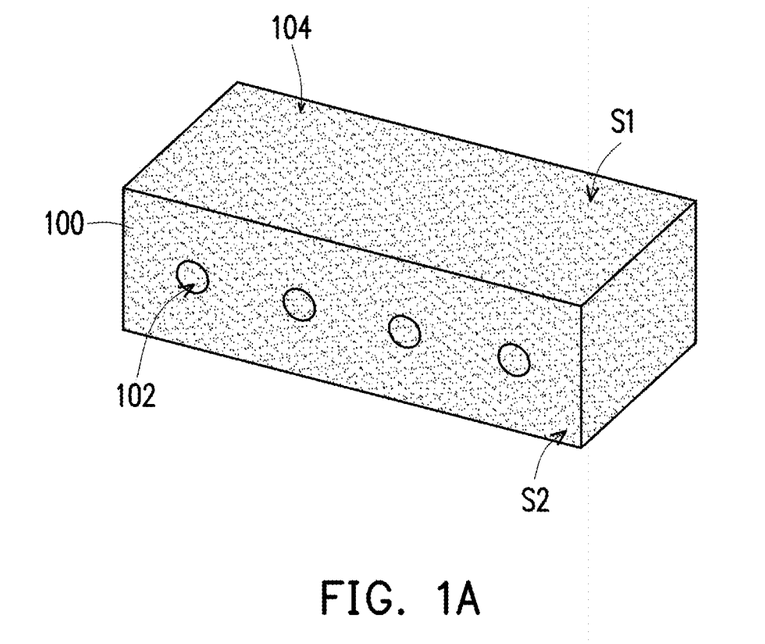
FIG. 1A to FIG. 1D are schematics of the manufacturing process of a ceramic device of an embodiment of the disclosure.
Figure 2:
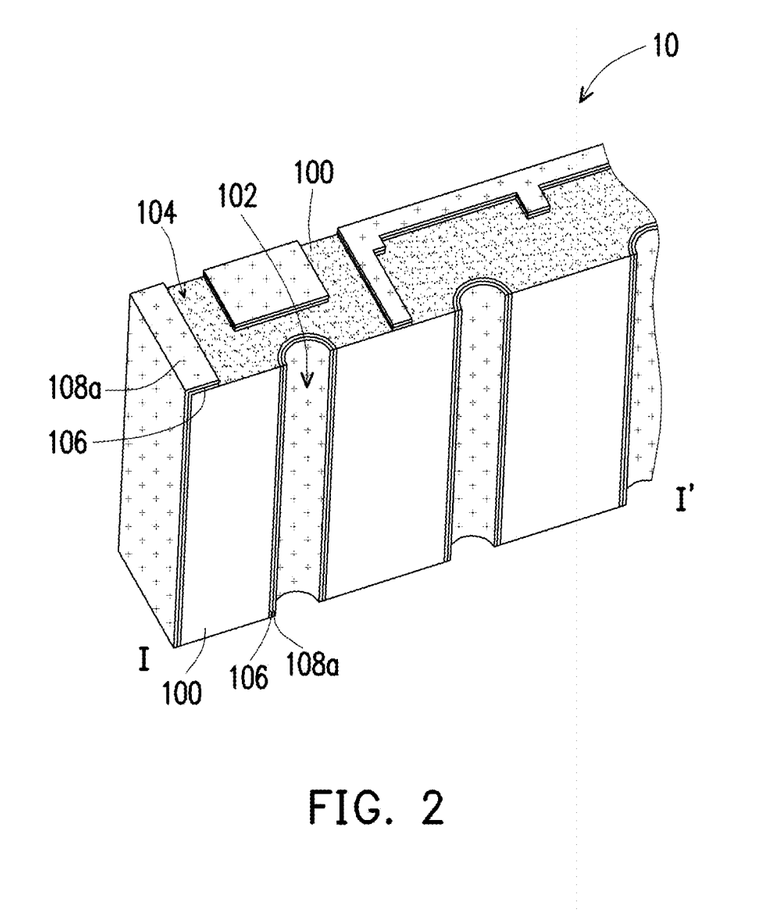
FIG. 2 is a cross section along section line I-I' in FIG. 1D.

Referring to FIG. 1A, a ceramic material 100 is provided. The ceramic material 100 is, for instance, calcium titanate ($CaTiO_3$), magnesium titanate ($MgTiO_3$), zinc titanate ($ZnTiO_3$), or a combination thereof. The ceramic material 100 may have at least one through-hole 102. In the present embodiment, the number of the through-hole 102 in the ceramic material 100 is four as an example, but the disclosure is not limited thereto. The aspect ratio of the through-hole 102 is, for instance, 12 or less. In an embodiment, the aspect ratio of the through-hole 102 is, for instance, 10 or less.

The surface of the ceramic material 100 may at least include a first surface S1 and a second surface S2 that are not coplanar. The first surface S1 and the second surface S2 may be adjacent or not adjacent to each other. In the present embodiment, the first surface S1 and the second surface S2 are adjacent to each other as an example. Moreover, although the shape of the ceramic material 100 is exemplified by a hexahedron, the disclosure is not limited thereto, and those having ordinary skill in the art may adjust the shape of the ceramic material 100 based on the design requirements of the product.

Next, small recesses 104 (represented by dots in the figures) are formed on the surface of the ceramic material 100. Moreover, the recesses 104 may also be formed on the surface of the through-hole 102. The surface roughness resulting from the recesses 104 on the ceramic material 100 is, for instance, less than 5 microns. The forming method of the recesses 104 includes, for instance, performing a wet etching process on the ceramic material 100. For instance, the ceramic material 100 may be immersed in an etchant to form the recesses 104 on the surface of the ceramic material 100. The etchant used in the wet etching process is, for instance, hydrofluoric acid, a mixture of sulfuric acid and hydrogen peroxide or a buffer oxide etchant (BOE), and the concentration of the etchant is, for instance, 1% to 20%. The ceramic material 100 is immersed in the etchant for, for instance, 1 minute to 10 minutes.

Figure 1B:
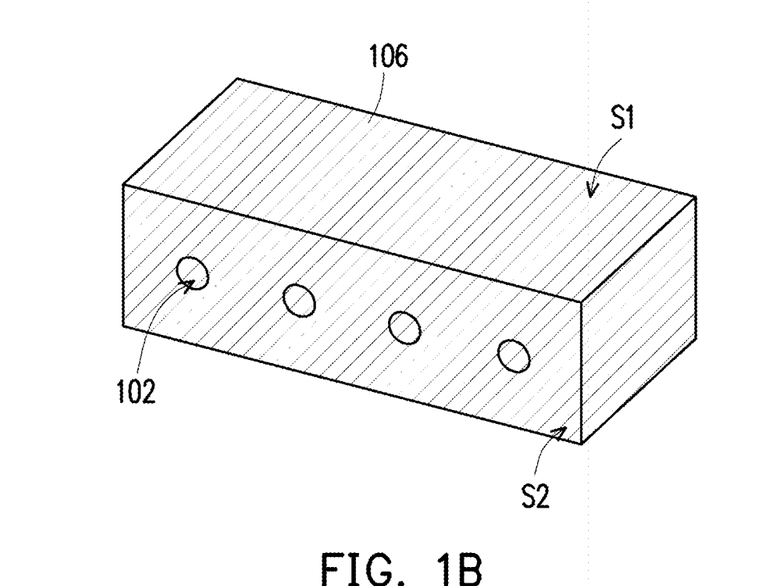

Next, referring to FIG. 1B, after the recesses 104 are formed, a surface activation treatment is performed on the surface of the ceramic material 100. Accordingly, a surface activation material 106 may be formed on the surface of the recesses 104. Moreover, the surface activation material 106 may more comprehensively cover the surface of the ceramic material 100. The surface activation material 106 is, for instance, palladium, gold, platinum, silver, or a compound thereof. The surface activation treatment includes reacting a reactant and a reducing agent on the surface of the ceramic material 100. The reactant is, for instance, palladium chloride ($PdCl_2$), palladium acetate, polyvinylpyrrolidone-palladium (PVP-Pd), polyvinyl alcohol-palladium (PVA-Pd), gold chloride, polyvinylpyrrolidone-platinum (PVP-Pt), polyvinyl alcohol-platinum (PVA-Pt), polyvinylpyrrolidone-silver (PVP-Ag), polyvinyl alcohol-silver (PVA-Ag), or a combination thereof, and the reducing agent is, for instance, stannous chloride, formaldehyde, or sodium phosphite.

Figure 1C:
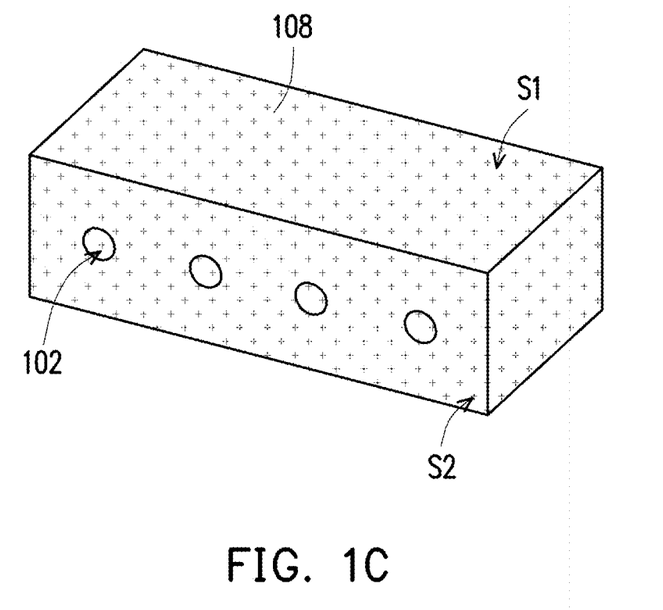

Next, referring to FIG. 1C, a first metal layer 108 is formed on the surface of the ceramic material 100 after surface activation treatment via an electroless plating process. The first metal layer 108 may be further formed on the surface of the through-hole 102. The surface activation material 106 may facilitate the bonding of the first metal layer 108 on the surface of the ceramic material 100. The material of the first metal layer 108 is, for instance, copper, nickel, silver, or gold.

Moreover, the forming method of the first metal layer 108 may further include performing an electroplating process after the electroless plating process to increase the thickness of the first metal layer 108 to a target thickness. In another embodiment, the first metal layer 108 having the target thickness may also be formed directly via an electroless plating process.

Figure 1D:
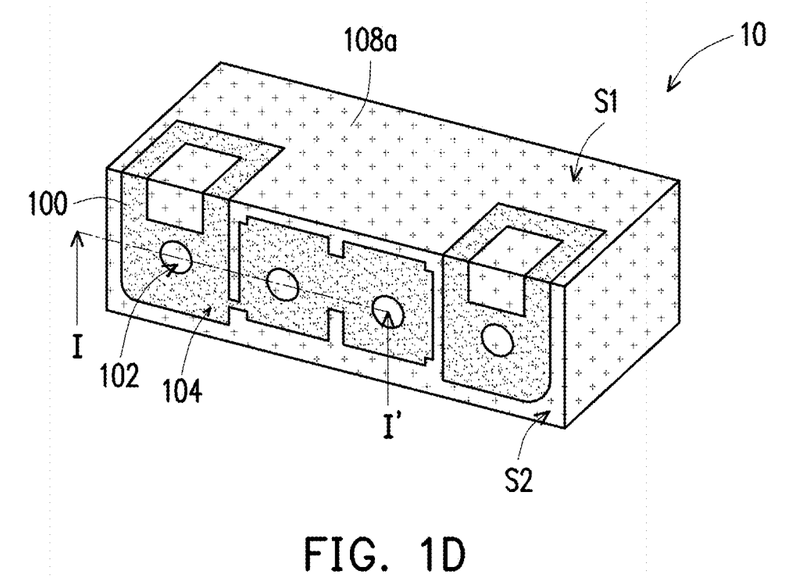

Next, referring to FIG. 1D, a patterning process is performed on the first metal layer 108 to form a first patterned metal layer 108a. The patterning process is, for instance, a laser patterning process. In the present embodiment, a portion of the first metal layer 108 and a portion of the surface activation material 106 may be removed via the patterning process to expose a portion of the surface of the ceramic material 100. It should be mentioned that, in the present embodiment, the portion of the surface of the ceramic material 100 exposed via a patterning process still has the recesses 104. However, in another embodiment, a portion of the first metal layer 108 may be removed via the patterning process to expose a portion of the surface activation material 106. Alternatively, in yet another embodiment, a portion of the first metal layer 108, a portion of the surface activation material 106, and the recesses 104 may be removed via the patterning process to expose a portion of the surface of the ceramic material 100, wherein the portion of the exposed surface does not have the recesses 104. The changes in the embodiments above are caused by controlling the depth removed in the patterning process and may be adjusted based on actual need and are not limited to the above.

Via the method above, a ceramic device 10 may be made. In the ceramic device 10, the material combination of the surface activation material 106 and the first patterned metal layer 108a may be selected based on process design requirements. For instance, the surface activation material 106 may be palladium, and the material of the first patterned metal layer 108a may be silver.

It may be known from the embodiments above that, in the manufacturing method of the ceramic device 10, since the first patterned metal layer 108a is formed on the surface of the ceramic material 100 after surface activation treatment via the electroless plating process and the patterning process and is not formed by a high-temperature sintering process, the metal circuit in the first patterned metal layer 108a has good position accuracy.

In the following, the ceramic device 10 of the embodiments above is described with FIG. 1D and FIG. 2.

Referring to FIG. 1D and FIG. 2, the ceramic device 10 includes the ceramic material 100, the patterned metal structure, and the surface activation material 106. The ceramic device 10 may be a filter (such as a high-frequency filter) or an antenna for a Global Positioning System. In the present embodiment, the ceramic device 10 is exemplified by a filter. The surface of the ceramic material 100 at least includes the first surface S1 and the second surface S2 that are not coplanar, and the ceramic material 100 has small recesses 104 on the surface thereof. The ceramic material 100 may have the through-hole 102. When the ceramic device 10 is a filter, one of the first surface S1 and the second surface S2 may be an electrode surface, and the other one of the first surface S1 and the second surface S2 may be a signal structure surface.

The patterned metal structure may be a single-layer structure or a multilayer structure. In the present embodiment, the patterned metal structure is exemplified by a single-layer structure of the first patterned metal layer 108a. The first patterned metal layer 108a (patterned metal structure) is disposed on the first surface S1 and the second surface S2, and may be further disposed on other surfaces of the ceramic material 100. Moreover, a portion of the first patterned metal layer 108a (patterned metal structure) may be disposed on the surface of the through-hole 102. The material of the first patterned metal layer 108a is, for instance, copper, nickel, silver, or gold.

The surface activation material 106 is disposed on the surface of the recesses 104 and located at the interface between the ceramic material 100 and the first patterned metal layer 108a (patterned metal structure). The surface activation material 106 is, for instance, palladium, gold, platinum, silver, or a compound thereof. Based on the total of the ceramic material 100 and the surface activation material 106, the content of the surface activation material 106 at the interface between the ceramic material 100 and the first patterned metal layer 108a (patterned metal structure) is, for instance, 5 wt % or less, such as 0.1 wt % to 5 wt %.

Moreover, the material, specification, forming method, or effect of each component in the ceramic device 10 are described in detail in the embodiments above and are therefore not repeated herein.

It may be known from the embodiments above that, in the ceramic device 100, since the surface activation material 106 is disposed on the surface of the recesses 104 of the ceramic material 100, the first patterned metal layer 108a (patterned metal structure) may be formed on the surface of the ceramic material 100 having the surface activation material 106 using the electroless plating process and the patterning process, and the high-temperature sintering process is not needed. Therefore, the metal circuit in the first patterned metal layer 108a (patterned metal structure) may have good position accuracy.

Figure 3A:
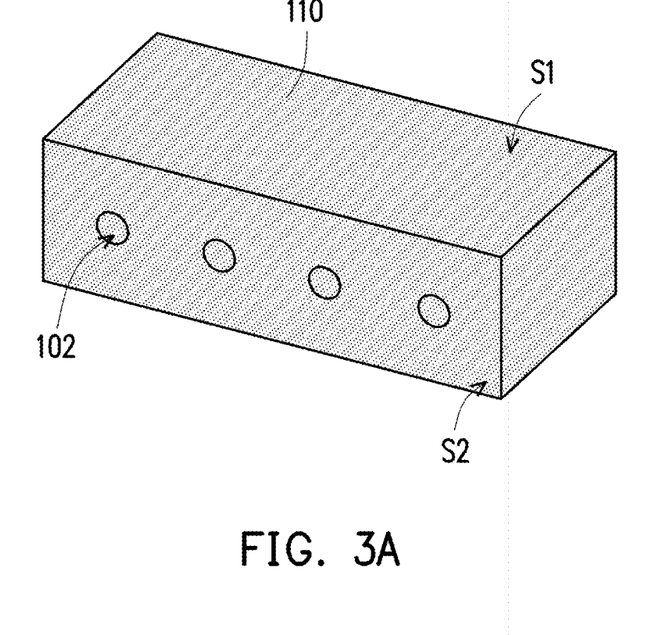
FIG. 3A to FIG. 3D are continuations of the manufacturing process of the ceramic device of FIG. 1C of another embodiment of the disclosure.

FIG. 3A to FIG. 3D are continuations of the manufacturing process of the ceramic device of FIG. 1C of another embodiment of the disclosure. FIG. 4 is a cross section along section line II-II' in FIG. 3D. The same components in FIG. 3A and FIG. 1C are described in the embodiments above and are therefore not repeated herein.

Referring to FIG. 3A, after the first metal layer 108 of FIG. 1C is formed and before the patterning process is performed, a second metal layer 110 is formed on the first metal layer 108. The second metal layer 110 may be used to protect the first metal layer 108 to prevent oxidation to the first metal layer 108. The thickness of the first metal layer 108 may be greater than the thickness of the second metal layer 110. The forming method of the second metal layer 110 is, for instance, an electroplating method or an electroless plating method. The material of the second metal layer 110 is, for instance, an electroplating metal or an electroless plated metal. The electroplating metal is, for instance, copper, nickel, silver, gold, platinum, tin, or an alloy thereof, and the electroless plated metal is, for instance, copper, nickel, silver, gold, platinum, or palladium.

Figure 3B:
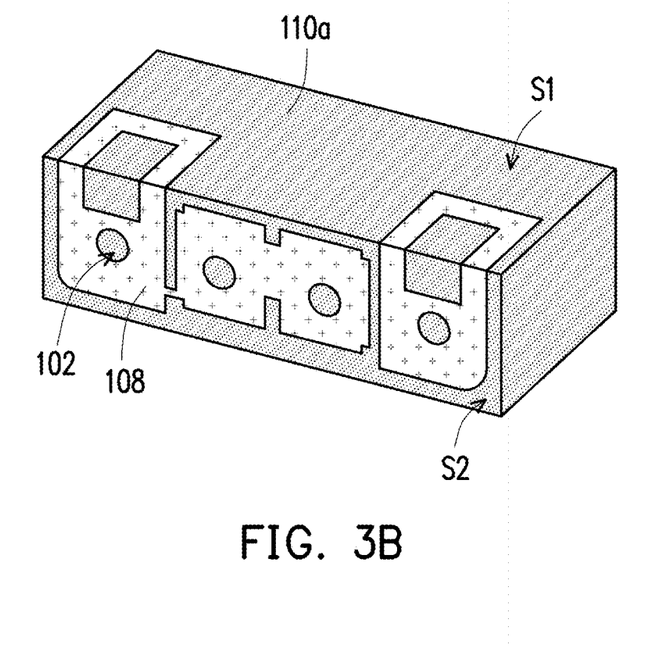
Figure 4:
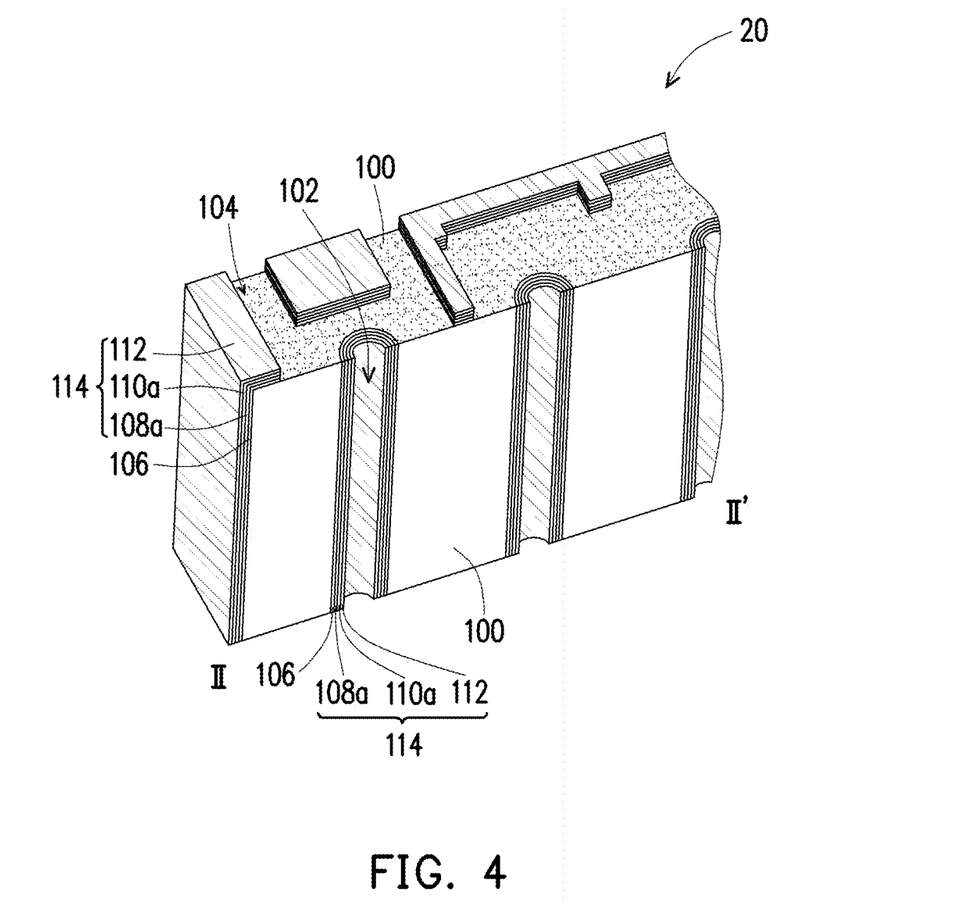
FIG. 4 is a cross section along section line II-II' in FIG. 3D.

Referring to FIG. 3B, a laser patterning process is performed on the second metal layer 110 to form a second patterned metal layer 110a. In the present embodiment, a portion of the second metal layer 110 may be removed via the laser patterning process to expose a portion of the surface of the first metal layer 108.

Figure 3C:
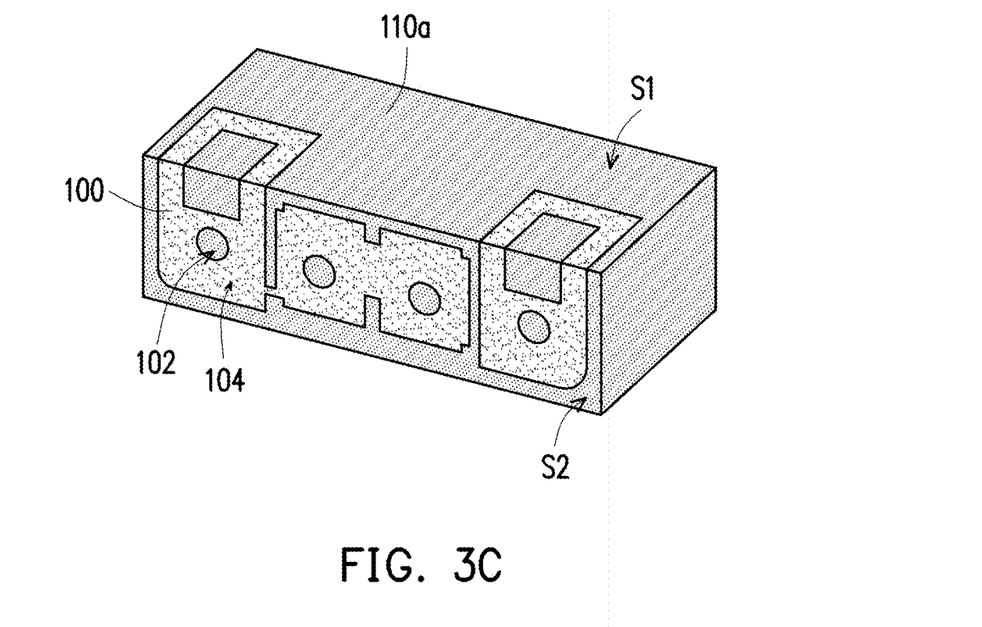

Referring to FIG. 3C, an etching process is performed on the first metal layer 108 by using the second patterned metal layer 110a as a mask. In the present embodiment, a portion of the first metal layer 108 and a portion of the surface activation material 106 may be removed via the etching process to expose a portion of the surface of the ceramic material 100. The etching process is, for instance, a wet etching process, and the etchant used is, for instance, phosphoric acid, sulfuric acid, or a mixture of the above-mentioned material and hydrogen peroxide. Accordingly, patterning may be performed on the first metal layer 108 to form the first patterned metal layer 108a (refer to FIG. 4) between the second patterned metal layer 110a and the ceramic material 100.

In the present embodiment, although the patterning process performed on the first metal layer 108 is exemplified by the method that mentioned above, the disclosure is not limited thereto. For instance, a laser patterning process may be directly performed on the second metal layer 110 in FIG. 3A and the first metal layer 108 located below to form the second patterned metal layer 110a in FIG. 3C and the first patterned metal layer 108a located below (refer to FIG. 4).

Figure 3D:
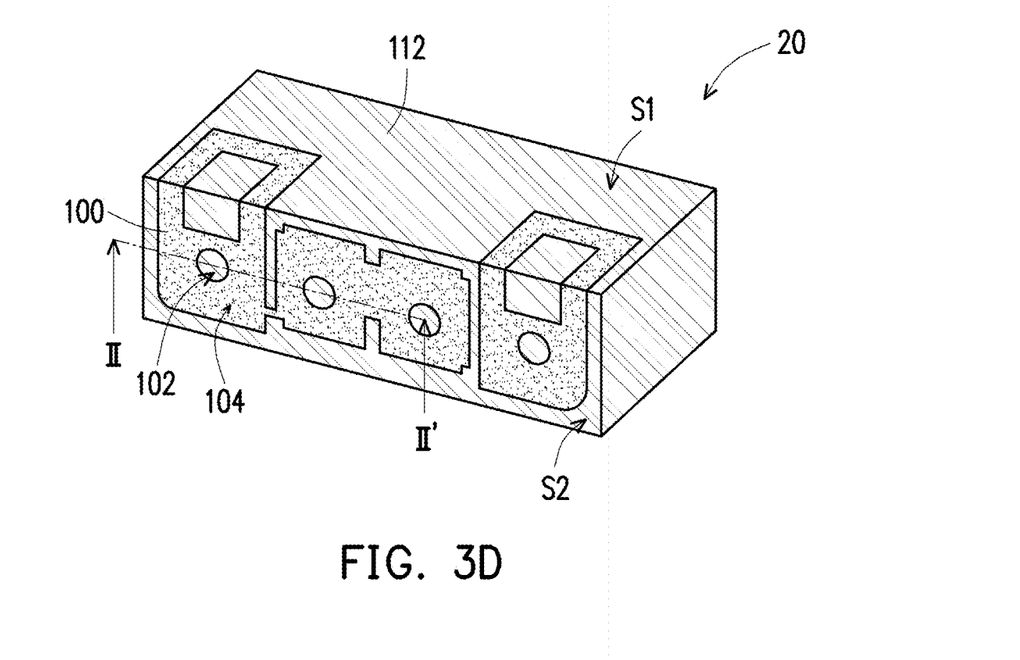

Referring to FIG. 3D, a third patterned metal layer 112 may be optionally formed on the second patterned metal layer 110a via an electroless plating process. The third patterned metal layer 112 may increase solderability. In the present embodiment, the third patterned metal layer 112 is only formed on the second patterned metal layer 11a and is not formed on the surface of the ceramic material 100 exposed by the second patterned metal layer 110a. The material of the third patterned metal layer 112 is, for instance, an electroplated metal or an electroless plated metal such as gold, nickel, silver, tin, platinum, or an alloy thereof.

Via the method that mentioned above, a ceramic device 20 may be made. In the ceramic device 20, the material combination of the surface activation material 106, the first patterned metal layer 108a, the second patterned metal layer 110a, and the third patterned metal layer 112 may be selected based on process design requirements. For instance, the surface activation material 106 may be palladium, the material of the first patterned metal layer 108 may be copper, the material of the second patterned metal layer 110a may be nickel, and the material of the third patterned metal layer 112 may be gold.

It may be known from the embodiments that mentioned above, in the manufacturing method of the ceramic device 20, since the patterned metal structure 114 is formed on the surface of the ceramic material 100 after surface activation treatment via the electroplating or electroless plating process and the patterning process and is not formed by the high-temperature sintering process, the metal circuit in the patterned metal structure 114 has good position accuracy.

In the following, the ceramic device 20 of the embodiments above is described via FIG. 3D and FIG. 4.

Referring to all of FIG. 1D, FIG. 2, FIG. 3D, and FIG. 4, the ceramic device 20 is similar to the ceramic device 10, but it should be noted that the patterned metal structure 114 of the ceramic device 20 is a multilayer structure. The patterned metal structure 114 includes the first patterned metal layer 108a and the second patterned metal layer 110a, and may further optionally include the third patterned metal layer 112. The patterned metal structure 114 is disposed on the first surface S1 and the second surface S2, and may be further disposed on other surfaces of the ceramic material 100. Moreover, a portion of the patterned metal structure 114 may be disposed on the surface of the through-hole 102. The surface activation material 106 is located at the interface between the ceramic material 100 and the patterned metal structure 114.

The first patterned metal layer 108a is disposed on the first surface S1 and the second surface S2, and may be further disposed on other surfaces of the ceramic material 100. Moreover, a portion of the first patterned metal layer 108a may be disposed on the surface of the through-hole 102. The material of the first patterned metal layer 108a is, for instance, copper, nickel, silver, or gold.

The second patterned metal layer 110a is disposed on the first patterned metal layer 108a. The thickness of the first patterned metal layer 108a may be greater than the thickness of the second patterned metal layer 110a. The material of the second patterned metal layer 110a is, for instance, the electroplated metal or the electroless plated metal. The electroplating metal is, for instance, copper, nickel, silver, gold, platinum, tin, or an alloy thereof, and the electroless plated metal is, for instance, copper, nickel, silver, gold, platinum, or palladium.

The third patterned metal layer 112 is disposed on the second patterned metal layer 110a. The material of the third patterned metal layer 112 is, for instance, the electroplated metal or the electroless plated metal such as gold, nickel, silver, tin, platinum, or an alloy thereof.

Moreover, similar components in the ceramic device 20 and the ceramic device 10 adopt the same reference numerals and are not repeated.

It may be known from the embodiments that mentioned above, in the ceramic device 20, since the surface activation material 106 is disposed on the surface of the recesses 104 of the ceramic material 100, the patterned metal structure 114 may be formed on the surface of the ceramic material 100 having the surface activation material 106 using an electroless plating process and a patterning process, and a high-temperature sintering process is not needed. Therefore, the metal circuit in the patterned metal structure 114 may have good position accuracy.

Experimental Examples

Example 1: Manufacture of Ceramic Filter

First, a wet etching process was performed to immerse a calcium magnesium titanate ceramic material in a 2% hydrofluoric acid (HF) solution for 10 minutes to form a plurality of micro-etched recesses on the ceramic material surface to increase a surface roughness Ra from 0.2 microns to 0.5 microns. Next, a surface activation treatment was performed to immerse the ceramic material containing the plurality of recesses in a solution containing stannous chloride (reducing agent) and palladium chloride (reactant) to perform a surface activation treatment such that palladium atoms (surface activation material) are adhered in the plurality of micro-etched recesses. Next, an electroless plating process was performed and the ceramic material after the surface activation treatment was placed in an electroless plated copper solution for 30 minutes to deposit copper metal on the surface of the ceramic material and in a through-hole having an aspect ratio of 8, and then copper metal was deposited again using an electroplating process such that the thickness of the copper metal reached a target value. Next, electroplated nickel or electroless plated nickel was deposited above the copper metal, and then a laser patterning process was performed on the nickel layer. Next, an etching process was performed on the copper metal layer by using the patterned nickel layer as a mask layer and using a mixture of phosphoric acid and hydrogen peroxide as the etchant. Lastly, an electroless gold plating process was performed on the nickel layer to obtain a ceramic filter.

Example 2: Detection of Surface Activation Material

Figure 5A:
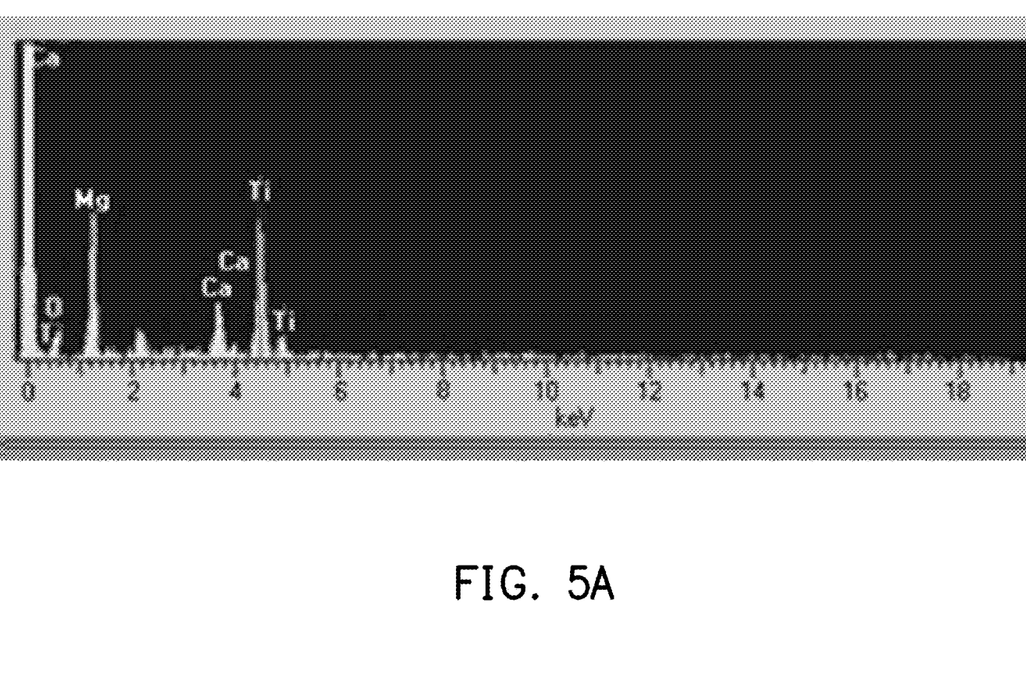
FIG. 5A shows the results of performing a surface activation material detection on a ceramic material before the surface activation treatment in a ceramic filter using a scanning electronic microscope/energy dispersive spectrometer (SEM/EDS).
Figure 5B:
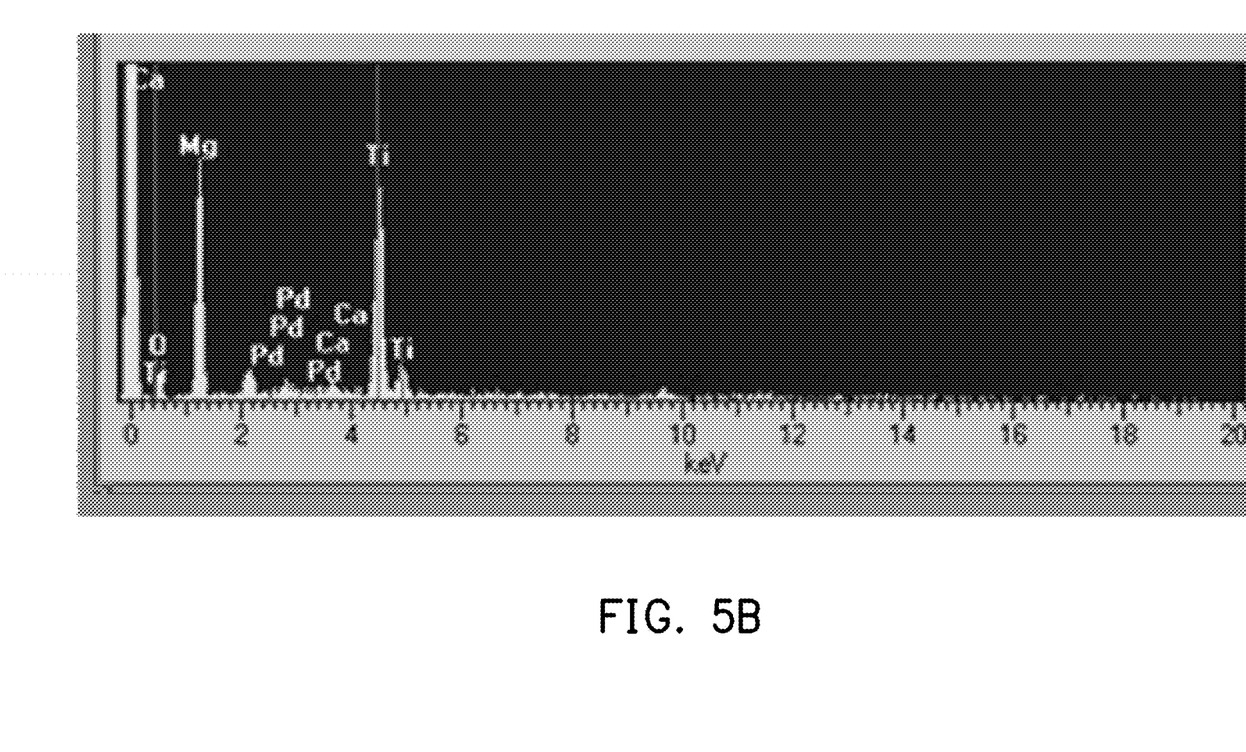
FIG. 5B shows the results of performing a surface activation material detection on a ceramic material after the surface activation treatment in a ceramic filter using SEM/EDS.

FIG. 5A shows the results of performing a surface activation material detection on a ceramic material before the surface activation treatment in a ceramic filter using SEM/EDS. FIG. 5B shows the results of performing a surface activation material detection on a ceramic material after the surface activation treatment in a ceramic filter using SEM/EDS.

The results from the surface activation material detection performed on the ceramic material before and after surface activation treatment in the ceramic filter of example 1 using a scanning electronic microscope/energy dispersive spectrometer (SEM/EDS) are as shown in FIG. 5A, FIG. 5B, Table 1, and Table 2.

TABLE 1

Components of ceramic material before surface activation treatment

| Component | Content (wt %) |
| --- | --- |
| O | 63 |
| Mg | 20.5 |
| Ca | 0.5 |
| Ti | 15.9 |

TABLE 2

Components of ceramic material after surface activation treatment

| Component | Content (wt %) |
| --- | --- |
| O | 62.8 |
| Mg | 20.3 |
| Ca | 0.5 |
| Ti | 15.7 |
| Pd | 0.6 |

It may be known from FIG. 5A, FIG. 5B, Table 1, and Table 2 that, before an acid etching process is performed on the ceramic material, the components of the ceramic material do not contain palladium atoms. After an acid etching process and a surface activation treatment are performed on the ceramic material, the components of the ceramic material contain 0.6 wt % of palladium atoms.

Based on the above, in the ceramic device and the manufacturing method thereof provided in the disclosure, since the surface activation material is disposed on the surface of the recesses of the ceramic material, the patterned metal structure may be formed on the surface of the ceramic material having the surface activation material using an electroless plating process and a patterning process, and a high-temperature sintering process is not needed. Therefore, the metal circuit in the patterned metal structure may have good position accuracy.

It will be apparent to those skilled in the art that various modifications and variations may be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:
1. A ceramic device, comprising:
a ceramic material, wherein a surface of the ceramic material at least comprises a first surface and a second surface that are not coplanar, and the ceramic material has recesses on the surface thereof;
a patterned metal structure disposed on the first surface and the second surface; and
a surface activation material disposed on a surface of the recesses and located at an interface between the ceramic material and the patterned metal structure, wherein
based on a total of the ceramic material and the surface activation material, a content of the surface activation material is 5 wt % or less at an interface between the ceramic material and the patterned metal structure.
2. The ceramic device of claim 1, wherein the ceramic material comprises calcium titanate ($CaTiO_3$), magnesium titanate ($MgTiO_3$), zinc titanate ($ZnTiO_3$), or a combination thereof.
3. The ceramic device of claim 1, wherein the first surface and the second surface are adjacent to each other.
4. The ceramic device of claim 1, wherein a surface roughness resulting from the recesses on the ceramic material is less than 5 microns.
5. The ceramic device of claim 1, wherein the ceramic material has at least one through-hole, and a portion of the patterned metal structure is disposed on a surface of the at least one through-hole.
6. The ceramic device of claim 5, wherein an aspect ratio of the at least one through-hole is 12 or less.

7. The ceramic device of claim 1, wherein the patterned metal structure comprises a first patterned metal layer.

8. The ceramic device of claim 7, wherein a material of the first patterned metal layer comprises copper, nickel, silver, or gold.

9. The ceramic device of claim 7, wherein the patterned metal structure further comprises a second patterned metal layer, and the second patterned metal layer is disposed on the first patterned metal layer.

10. The ceramic device of claim 9, wherein a thickness of the first patterned metal layer is greater than a thickness of the second patterned metal layer.

11. The ceramic device of claim 9, wherein a material of the second patterned metal layer comprises an electroplated metal or an electroless plated metal.

12. The ceramic device of claim 11, wherein the electroplated metal comprises copper, nickel, silver, gold, platinum, tin, or alloy thereof, or the electroless plated metal comprises copper, nickel, silver, gold, platinum, or palladium.

13. The ceramic device of claim 9, wherein the patterned metal structure further comprises a third patterned metal layer, and the third patterned metal layer is disposed on the second patterned metal layer.

14. The ceramic device of claim 13, wherein a material of the third patterned metal layer comprises an electroplated metal or an electroless plated metal.

15. The ceramic device of claim 14, wherein the electroplated metal or the electroless plated metal comprises gold, nickel, silver, tin, platinum, or alloy thereof.

16. The ceramic device of claim 1, wherein the surface activation material comprises palladium, gold, platinum, silver, or a compound thereof.

17. The ceramic device of claim 1, wherein the ceramic device comprises a filter or an antenna for a Global Positioning System.

18. The ceramic device of claim 1, wherein the first surface and the second surface are not adjacent to each other.

* * * * *